Sept. 20, 1932.  W. B. COLLUM  1,877,812
MECHANISM FOR TRIMMING PICKERS
Filed June 19, 1931   3 Sheets-Sheet 1
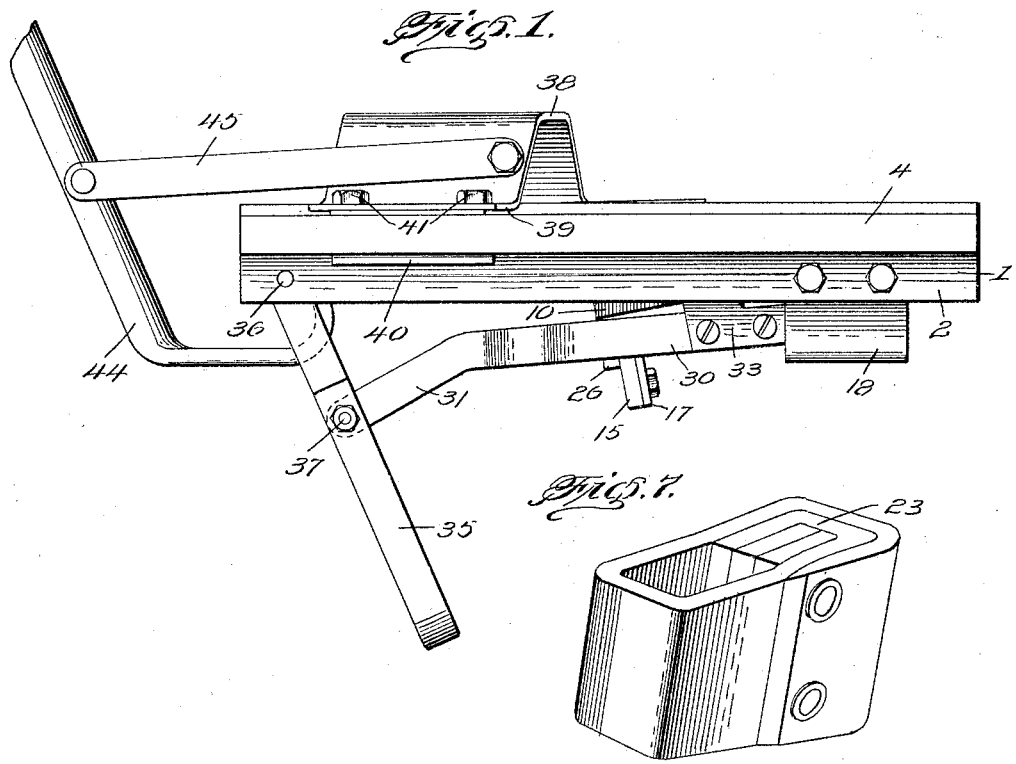
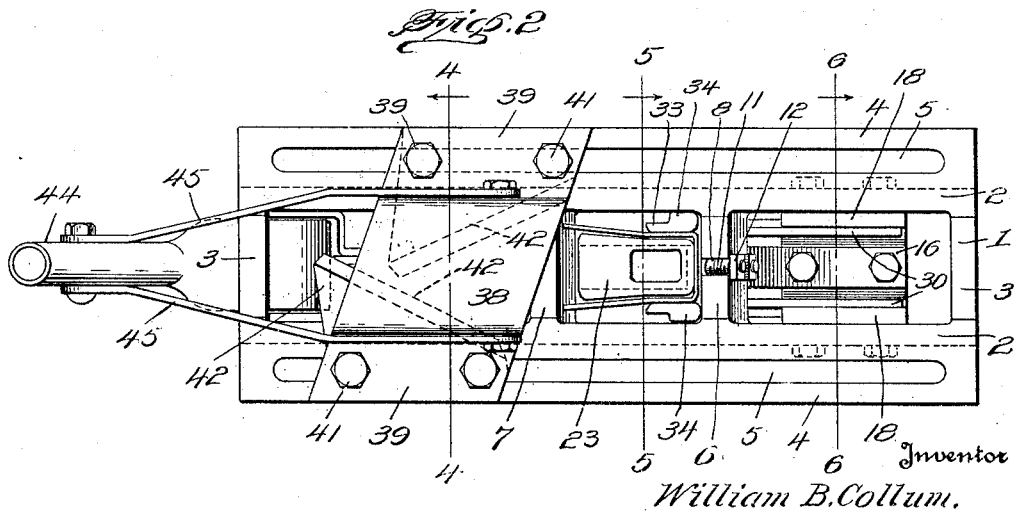
Inventor
William B. Collum.
By Jack R. Richmond
Attorney

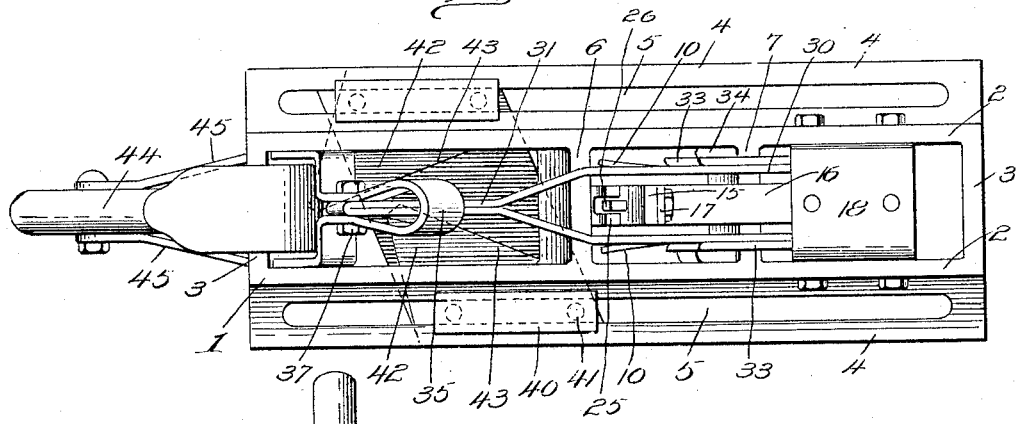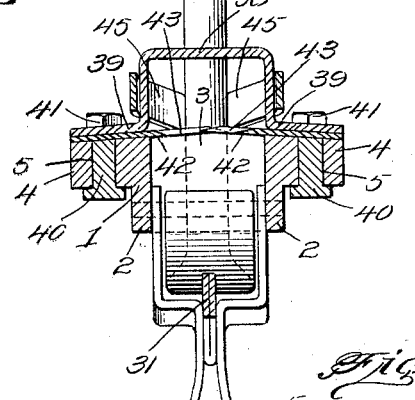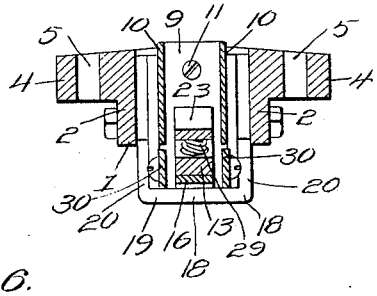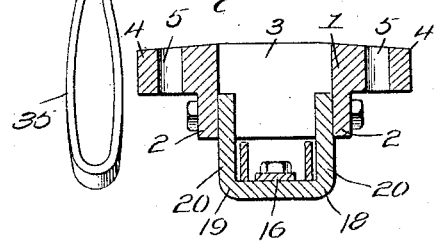

Sept. 20, 1932.  W. B. COLLUM  1,877,812
MECHANISM FOR TRIMMING PICKERS
Filed June 19, 1931  3 Sheets-Sheet 3
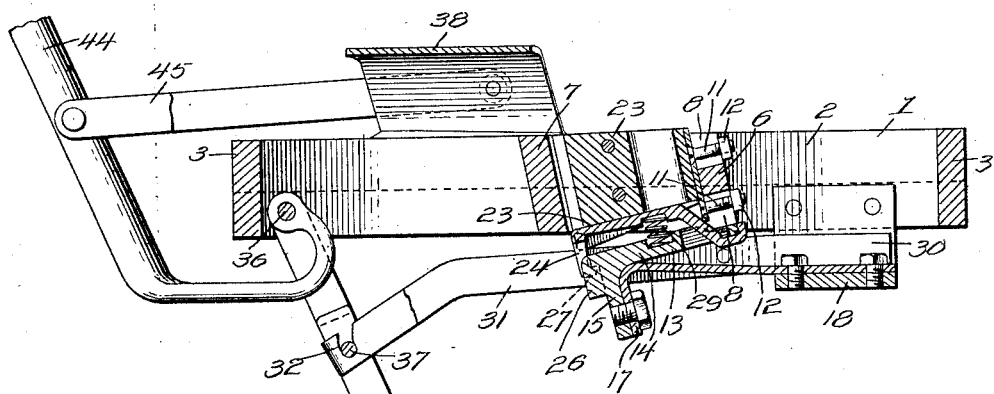
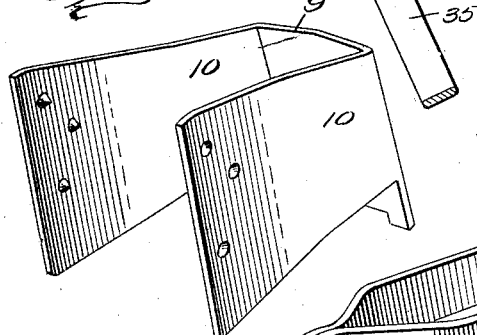
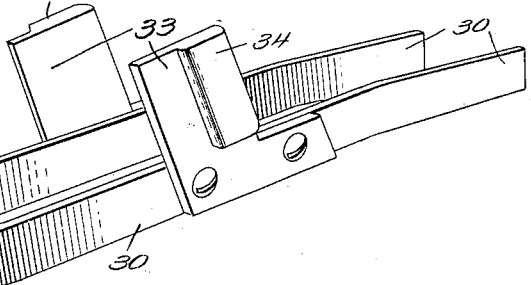
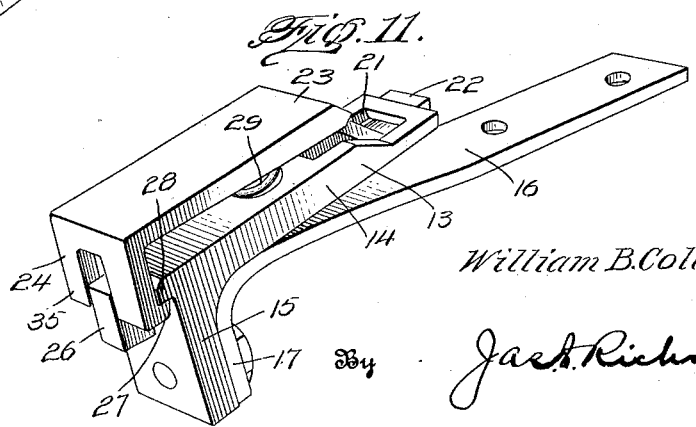
Inventor
William B. Collum.
By Jack Richmond
Attorney Patented Sept. 20, 1932

1,877,812

UNITED STATES PATENT OFFICE

WILLIAM B. COLLUM, OF GAINESVILLE, GEORGIA

MECHANISM FOR TRIMMING PICKERS

Application filed June 19, 1931. Serial No. 545,584.

This invention is directed to a trimming mechanism for loom pickers, wherein the pickers may be readily and safely cut to a uniform size, either for original installation, or for reuse after distortion from continued use.

Pickers of the type herein referred to are to be applied to picker sticks of looms for shuttle operation, and incident to this use the picker soon becomes distorted and somewhat ineffective in operation; and it has heretofore been the custom to trim such picker to proper size and contour by hand. This operation, aside from the liability of injury to the operator, cannot produce pickers of uniform size and shape, and furthermore, requires a considerable time in hand trimming the number of pickers daily requiring this correction.

The present invention is directed to the provision of a mechanism in which the new or worn picker may be readily clamped and subsequently trimmed to a proper size and shape for the particular picker stick with which it is to cooperate; with such mechanism not only resulting in a uniform product but carrying out the trimming operation in a simple, speedy action, with the additional factor of complete safety to the operator.

The invention is illustrated in the accompanying drawings, in which:—

Fig. 1 is a side elevation of the improved picker trimming mechanism.

Fig. 2 is a top plan view of the same.

Fig. 3 is a bottom plan view of the same.

Fig. 4 is a transverse section on the line 4—4 of Fig. 2.

Fig. 5 is a vertical section on the line 5—5 of Fig. 2.

Fig. 6 is a vertical section on the line 6—6 of Fig. 2.

Fig. 7 is a perspective view of the picker.

Fig. 8 is a longitudinal sectional view of the picker trimming mechanism.

Fig. 9 is a perspective view of the clamp.

Fig. 10 is a perspective view of the operating means for the clamp.

Fig. 11 is a perspective view of the yieldable bottom for the clamp.

The improved picker trimming mechanism includes a bed plate 1, of elongated form in plan, with a central opening extending throughout the length of the plate and defined by side walls 2 and end walls 3. The bed plate, beyond the side walls 2 of the central opening, includes guide sections 4, coplanar with the upper surface of the bed plate, but of less thickness than the similar dimension of the side walls 2. The guide sections 4 are formed with longitudinal guide slots 5. The upper surface of the bed plate is slightly convex, as shown.

Secured between, or integral with the side walls 2 are transverse spaced walls 6 and 7, one such, as 6, being centrally channeled in its top and bottom edges, as at 8 to adjustably receive the picker clamp. This clamp comprises a U-shaped member, having an end section 9 and side sections 10, the latter being inherently resilient. The clamp is secured to the wall 6 through bolts 11 projecting from the end section 9 of the clamp fitting in the channels 8 at the top and bottom of the wall 6, bolt-securing means, as nuts 12, securing the clamp in place. The clamp is thus adjustably secured in place through the permissible movement of the bolts 11 in the channels 8, the end section of the clamp being fixed to the wall 6, while the resilient side sections extend rearwardly and wholly free of connection to the bed plate.

The clamp includes a bottom section on which the picker is initially placed, this bottom section being yieldable under pressure to properly position the picker for cutting or trimming, as will later appear. This bottom section comprises a supporting plate 13 of right-angled form having a long arm 14 to fit between the side sections of the clamp and a short arm 15 depending from the rear end of the long arm. This supporting plate is secured in place by an arm 16 terminally secured at 17 to the free end of the short arm 15, the arm 16 extending forwardly of the bed plate and being removably secured to the cross plate 18 of a U-shaped member 19, the side plates 20 of which are secured to the relatively inner sides of the side walls 2 of the bed plate.

The free end of the long arm of the supporting plate 13 is formed with an elongated slot 21, and loosely seated in this slot is the hooked terminal 22 of a clamp bottom plate 23. The plate 23 is upwardly offset relative to its hooked terminal, and its free end is provided with a depending portion 24, longitudinally slotted at 25 to receive a lug 26 on the short arm 15 of the supporting plate 13, for guiding the clamp bottom in movement. The lower end of the depending portion 24 of the clamp bottom is laterally extended to provide hook portions 27, the upper end of the short arm 15 of the supporting plate having cooperating shoulders 28, to thereby limit the relative upward movement of the clamp bottom. A coil or other spring 29 is arranged between the clamp bottom and the upper surface of the long arm 14 of the supporting plate, this spring tending normally to hold the clamp bottom at its upper limit of movement, that is with the hook portions 27 and shoulders 28 in engagement, while at the same time permitting downward movement of the clamp bottom under pressure on the upper surface thereof.

The side sections 10 of the clamp are rearwardly divergent, and are adapted to be forced toward each other for the clamping operation. To provide for this result spaced bars 30 are slidably guided at their forward ends in the member 19, bearing against the inner surfaces of the side plates 20 thereof. These bars extend rearwardly beneath the clamp, and forwardly of the clamp are merged into a single bar 31, terminally formed with an upwardly opening recess 32. Beneath the clamp the bars 30 are provided with upstanding elements 33, extended between the side bars 2 of the bed plate and the clamp sections 10, such elements being thickened at 34 to provide wedge elements to cooperate with the clamp sections. Obviously, in the rearward movement of the bars 30, the wedge members 34 tend to force the clamp sections 10 inwardly to grip the picker placed therebetween.

The clamping bars 30 are operated through a hand lever 35, swingingly mounted on a shaft 36, supported in the side bars 2 of the bed plate at the end remote from the U-shaped member 19. This lever is provided with a cross bar 37, with which, through cooperation of the recess 32, the bars 30, and thereby the clamping wedges 34 are moved in either direction relative to the clamp sections 10, thus relatively tightening or loosening the grip of these clamp sections.

A cutter frame, including an inverted U-shaped section 38 is guided on the upper surface of the bed plate, the section 38 having lateral flanges 39 overlying the guide sections 4, from which flanges depend elongated blocks 40, slidably fitting the guide slots 5. The blocks are preferably secured to the flanges by bolts 41 headed below the guide sections to prevent upward movement of the cutter section 38. The front and rear end edges of the cutter section 38 are inclined to the transverse plane of the bed plate, so that the flange 39 on one side is in advance of the flange 39 on the opposite side.

Fixed between the respective flanges 39 and the blocks 40 are cutting blades 42. These blades are held in position by the bolts uniting the flanges and blocks, and are each formed with a beveled cutting edge 43. The cutting edge of each blade extends from a point immediately adjacent the forward edge of the particular flange 39, inwardly and rearwardly, to present a shearing edge. As the respective cutter blades are offset transversely of the cutter frame, the inclined shearing edge of one is arranged rearwardly of the similar edge of the other. Thus the blades, or more particularly their shearing edges, may operate in the same horizontal plane, and completely cover and cut the full transverse area of any article held in the clamp in the path of the cutters.

A cutter lever 44 is swingingly supported on the shaft 36 of the bed plate, this lever being extended around the end of the bed plate and projected upwardly for convenient operation from above the bed plate. Bars 45 pivotally connected to the cutter lever and to the sides of the cutter frame 38 insure cutter movement in the operation of the lever 44.

The picker, as illustrated in Fig. 7, is placed in the clamp, between the sections 10 thereof. The picker is forced downwardly until the rivets, which usually unite the parts of the picker are below the upper edge of the clamp sections 10. This is permitted by the yielding bottom plate 23. When in proper position, the lever 35 is moved rearwardly, forcing the wedge elements 34 to force the clamp sections 10 into gripping relation with the picker. The cutter lever 44 is then operated to move the blades over the clamp, causing their cutting edges to cleanly and evenly shear the upper portion of the picker, and properly shape and reform this portion for further use.

The clamp may be vertically adjusted as described, thus permitting cutting at different heights of the picker. It is to be noted that the cutting blades are entirely concealed within the cutting frame, and that at no time is it possible for the operator to be damaged by such blades. Furthermore, the cutting of the pickers, in any fixed adjustment, insures absolute uniformity in the finished product, entirely avoiding the liability of imperfect fit incident to the usual hand cutting.

The mechanism is designed as a permanent installation in a weave room, and may be secured to a bench or the elements 19 may be held in the jaws of an ordinary vise. The pickers as required from time to time may be placed in the clamp, the cutters operated, and the picker restored to usual size and outline, with the minimum loss of time and labor and with perfect safety to the operator.

Having thus described the invention, what is claimed as new, is:—

1. A picker trimming mechanism, including a bed plate, a clamp having resilient side portions for engaging the picker, means carried by the bed plate for moving the resilient clamp portions together to clamp a picker, a cutter frame guided in the bed plate, means for operating the cutter frame, and two transversely offset cutter blades carried by the frame with cutting edges inclined to the plane of movement of the cutter frame.

2. A picker trimming mechanism comprising a bed plate, a clamp having resilient side sections mounted in the bed plate, means carried by the bed plate for forcing the clamp sections toward each other, a lever for operating said means, and a cutter carrying frame movable on the bed plate with a cutting plane immediately above the upper edge of the clamp.

3. A picker trimming mechanism comprising a bed plate, a resilient clamp carried by the bed plate, means carried by the bed plate for compelling a picker-clamping movement of said clamp, a cutter frame movable over the clamp, shearing transversely offset cutting blades carried by and concealed within said frame, and a lever swingingly supported by the bed plate for operating said cutter frame.

4. A picker trimming mechanism comprising a bed plate, cutting means movable thereon, a lever for operating said cutting means, a clamp carried by the bed plate, a yielding bottom for said clamp, means for adjusting the clamp to grip a picker, and a lever for operating said adjusting means.

5. A trimming mechanism for loom-pickers, including a clamp having resilient sides and bottom for receiving the picker, a manually-operable member for cooperating with the sides of the clamp to engage and hold the picker, and cutters movable over the clamp to trim the picker.

6. A trimming mechanism for loom-pickers, including a clamp having resilient sides between which the picker is loosely received, elements movable longitudinally of the clamp to compress the side walls thereof onto the picker for clamping the latter, a lever for operating said elements, and a plurality of angle-shearing cutters movable over the upper edge of the clamp to trim the picker.

7. A trimming mechanism for loom-pickers, including a frame, a clamp mounted in the frame to loosely receive the picker, said clamp having resilient side walls, elements movable longitudinally of the frame for engaging the side walls of the clamp and forcing said walls into gripping cooperation with the picker, a cutter frame movable in the frame in a plane above the clamp, means for operating the cutter frame, and blades with cutting edges of opposed angular relation carried by the cutter frame.

8. A trimming mechanism for loom-pickers, including a frame, a clamp vertically adjustable therein and having resilient side walls to loosely receive the picker, manually operable means for forcing the side walls of the clamp toward each other to grip the picker, a resilient bottom for the clamp, and shearing cutters movable in the frame above the upper edge of the clamp, each of said cutters moving at an angle to the longitudinal plane of the clamp.

In testimony whereof I affix my signature.

WILLIAM B. COLLUM.